United States Patent [19]

Hong

[11] Patent Number: 5,050,967

[45] Date of Patent: Sep. 24, 1991

[54] ADAPTIVE NOTCH FILTER USING ACOUSTO-OPTICS AND PHOTOREFRACTION

[75] Inventor: John H. Hong, Moorpark, Calif.

[73] Assignee: Rockwell International Corporation, El Segundo, Calif.

[21] Appl. No.: 351,228

[22] Filed: May 15, 1989

[51] Int. Cl.[5] .......................... G02F 1/11; G02F 1/03; G02B 27/42

[52] U.S. Cl. ................................. 359/285; 359/559; 359/634; 359/111; 359/566

[58] Field of Search .................... 350/358, 354, 162.12, 350/162.13, 162.2, 372, 404, 162.17; 356/346, 349, 361

[56] References Cited

U.S. PATENT DOCUMENTS

| | | | |
|---|---|---|---|
| 4,179,194 | 12/1979 | Geller et al. | 350/356 |
| 4,699,466 | 10/1987 | Brandstetter et al. | 350/162.12 |
| 4,726,639 | 2/1988 | Brody | 350/162.14 |
| 4,874,223 | 10/1989 | O'Meara | 350/358 |
| 4,884,867 | 12/1989 | Brandstetter et al. | 350/162.12 |
| 4,906,069 | 3/1990 | Brandstetter et al. | 350/358 |

FOREIGN PATENT DOCUMENTS 2596878  10/1987  France ................................ 350/358

OTHER PUBLICATIONS

Feichtner, et al.; "Programmable Acoustooptic Filters—Characteristics and Potential Applications in Optical Computing"; Conference: Proceedings of the 1978 International Optical Computing Conference, London, Eng. (Sep. 5-7, 78).

Chang et al.; "Wideband Acoust-Optic Bragg Cells", Ultrasonics Symposium; 1981, pp. 735-739.

D. Anderson and M. Erie, "Resonator Memories and Optical Novelty Filters", Optical Engineering, 434-44, May 1987.

Primary Examiner—Eugene R. LaRoche
Assistant Examiner—E. A. Lester
Attorney, Agent, or Firm—John C. McFarren

[57] ABSTRACT

Nonlinear optical techniques are utilized to provide an adaptive notch filter for removing narrowband noise from broadband RF communication signals. The received RF signal is converted to a corresponding acoustic wave propagated in an acousto-optic cell. Two mutually coherent beams of light are passed through and diffracted by the acousto-optic cell. The diffracted beams are modulated by the acoustic wave, the second beam being modulated at a predetermined time delay with respect to the first beam. By proper selection of the time delay, the narrowband components of the two beams remain mutually coherent while the broadband components become mutually incoherent. The two diffracted beams are then mixed within a photorefractive crystal so that a first mixed beam comprises substantially all of the narrowband components while a second mixed beam consists essentially of only the broadband components. The second mixed beam is then detected and processed to filter out the time delay echo, leaving the useful broadband signal without the narrowband noise.

13 Claims, 1 Drawing Sheet

ADAPTIVE NOTCH FILTER USING ACOUSTO-OPTICS AND PHOTOREFRACTION

TECHNICAL FIELD

The present invention relates to filtering of radio frequency signals and, in particular, to an adaptive notch filter that uses acousto-optic and photorefractive devices to remove unwanted narrowband components from a broadband RF signal.

BACKGROUND OF THE INVENTION

For as long as electromagnetic radiation has been used for communications, there have been attempts to interfere with those communications by jamming the radio frequency transmissions. Consequently, there has been continuing interest in systems that defeat the jamming by extracting the useful components from the jammed signal.

For reasons such as cost, power constraints, and simplicity, RF jamming typically is performed on a narrow frequency band compared with the broad frequency band of the useful signal. However, separating the useful broadband signal from the narrowband jamming signal is difficult because the actual frequencies of the narrowband jammers generally are not known beforehand. In the past, adaptive filters using nonlinear feedback and various algorithms have been implemented with varying degrees of success in filtering the jammed signal. The primary drawback of such systems has been their complexity, with the attendant problems of high cost and low reliability. Thus, there is a need for a system that is relatively simple but effective in removing narrowband jamming noise from a broadband RF signal.

In the field of nonlinear optics, the photorefractive effect occurs in a class of crystals such as barium titanate ($BaTiO_3$) and strontium barium niobate (SBN). A two-wave mixing phenomenon is known in which two coherent beams of light crossing within the volume of a photorefractive crystal can exchange energy. In such two-wave mixing, it is known that one beam can be amplified at the expense of the other with the direction of the energy flow determined by the orientation of the photorefractive crystal. A time constant associated with two-wave mixing in photorefractive crystals is approximately inversely proportional to the intensity of the light and ranges from milliseconds to seconds at commonly used light intensities. Furthermore, the two-wave mixing phenomenon is critically dependent on the relative coherence of the two beams of light. It is this coherence dependent two-wave mixing phenomenon that is utilized in the present invention to remove narrowband jamming noise from a broadband RF signal.

SUMMARY OF THE INVENTION

The present invention includes a method and a combination of optical devices that are useful in filtering narrowband components from a broadband radio frequency (RF) signal. In military communications, for example, it is sometimes necessary to separate a narrowband jamming signal from a broadband communication signal. To meet this need, the present invention provides an adaptive filtering system that filters out narrowband jamming signals having frequencies that are not known beforehand.

In the present invention, a broadband RF signal that may include a narrowband noise component is received and converted to a corresponding electrical signal. The electrical signal is input to a transducer that launches a corresponding acoustic wave into an acousto-optic cell for propagation along the length of the cell. A coherent beam of light from a laser is split and then passed through and diffracted by the acousto-optic cell at two different points along the length of the cell. The diffracted beams carry the modulations of the acoustic wave at two different time delays. By properly selecting the relative acoustic time delay seen by the two beams, the narrowband components of the two light beams remain temporally coherent. However, the broadband components of the two beams become incoherent with the original beams and mutually incoherent due to the time delay.

The two diffracted light beams are then mixed in a photorefractive crystal. With proper crystal orientation, the energy of the coherent portion of one of the beams can be transferred to the other beam in the known process of two-wave mixing. The energy of the incoherent portions of the two beams, however, does not experience the two-wave mixing phenomenon and is divided between the two mixed beams emitted by the photorefractive crystal.

Thus, one of the mixed beams emitted by the photorefractive crystal contains substantially all of the narrowband components mixed with the broadband components while the other mixed beam consists essentially of only the broadband components. The mixed beam containing only the broadband components is then detected and processed to remove the known time delay distortion and output as an electrical signal containing only the useful broadband component of the original RF signal.

BRIEF DESCRIPTION OF THE DRAWINGS

For a more complete understanding of the present invention and for further advantages thereof, the following Description of the Preferred Embodiment provides reference to the accompanying Drawings, in which the FIGURE is a schematic block diagram of the adaptive notch filter of the present invention.

DESCRIPTION OF THE PREFERRED EMBODIMENT

Figure 1:
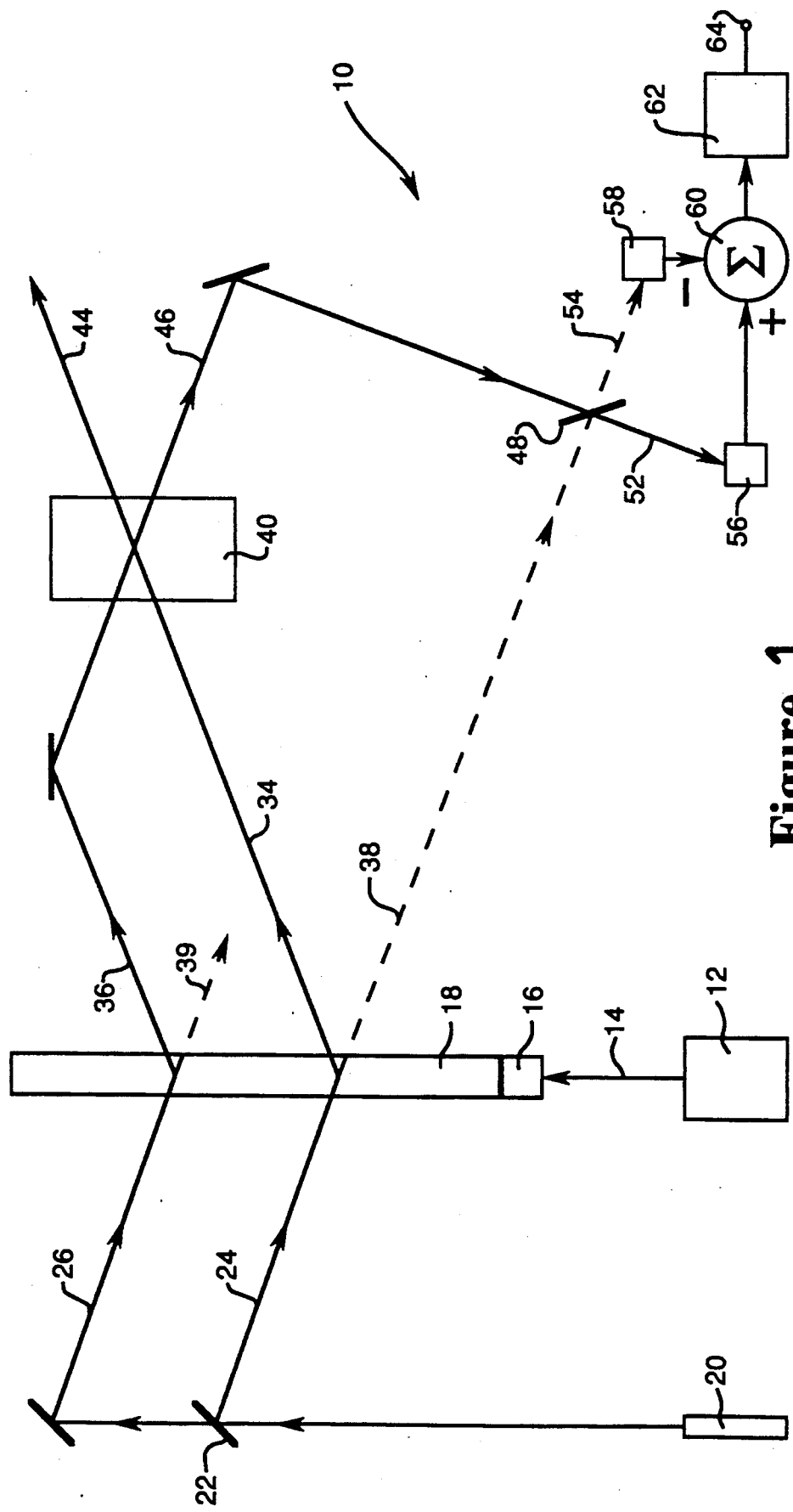

The present invention comprises an adaptive notch filter that removes narrowband noise from a broadband RF signal. The invention utilizes the special properties of acousto-optic cells, photorefractive crystals, and coherent light beams to separate the unwanted narrowband noise from the useful broadband signal. The system is adaptive in that it is not necessary to know beforehand the frequencies of the narrowband signals to be excised.

Referring to the FIGURE, reference numeral 10 generally indicates an adaptive notch filter of the present invention. A broadband RF signal is received by receiver 12 and converted to a corresponding electrical signal. The received RF signal, $f(t)=b(t)+n(t)$, includes a broadband signal, b(t), and may include unwanted narrowband noise, n(t), having frequencies not known beforehand. The corresponding electrical signal generated by receiver 12 is input on line 14 to a transducer 16. Transducer 16 converts the electrical signal into a corresponding acoustic wave that is launched into an acousto-optic cell 18 for propagation along the length of the cell.

A light source, such as a laser 20, emits a coherent beam of light that is split by beam splitter 22 into a first beam 24 and a second beam 26. Beams 24 and 26 comprise mutually coherent beams of light. Beams 24 and 26 are passed through and diffracted by acousto-optic cell 18 to produce diffracted beams 34 and 36, respectively, and undiffracted beams 38 and 39. As beams 24 and 26 pass through acousto-optic cell 18 they are modulated by the acoustic wave propagating from transducer 16. Because beams 24 and 26 pass through acousto-optic cell 18 at two different distances from transducer 16, the diffracted beams 34 and 36 are modulated by the acoustic wave at two different time delays. Thus, if beam 34 carries the signal $b(t)+n(t)$, then beam 36 carries the signal $b(t-T)+n(t-T)$, where T is a time delay determined by the spacing of the beams.

Selection of the time delay T is important to the operation of the present invention. If the narrowband signal $n(t)$ has a bandwidth of 1 KHz, for example, then spacing beams 24 and 26 for a time delay of less than 1 msec. guarantees that the two diffracted beams 34 and 36 modulated by $n(t)$ and $n(t-T)$, respectively, remain temporally coherent. In practice, this limitation poses no major constraint since acousto-optic cell time delays are generally limited to less than approximately 100 $\mu$sec. because of acoustic diffraction and attenuation. On the other hand, if the broadband signal $b(t)$ has a bandwidth of $\Delta f$, then spacing beams 24 and 26 for a time delay of $T>(\Delta f)^{-1}$ guarantees that the diffracted beams 34 and 36 modulated by $b(t)$ and $b(t-T)$, respectively, are mutually incoherent. Thus, with the proper time delay, beams 34 and 36 have the same nominal wavelength, but the portions of the beams carrying $n(t)$ and $n(t-T)$ remain coherent and the portions of the beams carrying $b(t)$ and $b(t-T)$ become mutually incoherent.

The present invention utilizes a known wave mixing phenomenon that occurs in photorefractive crystals. The photorefractive effect is a nonlinear optical phenomenon that takes place in crystals such as $BaTiO_3$ and SBN. With proper crystal orientation, it is known that the energy in one beam of coherent light can be transferred to a second beam of mutually coherent light crossing the first beam within the volume of the crystal. However, if the two input beams include mutually incoherent components, the mixing process becomes more complicated. In this situation, the energy of the coherent components is combined in one of the emitted beams while the energy of the incoherent components is divided between the two emitted beams.

Referring again to the FIGURE, diffracted light beams 34 and 36 are directed to cross within the volume of a photorefractive crystal 40. With proper orientation of crystal 40, the narrowband component $n(t-T)$ of beam 36 is transferred to mixed beam 44, which also includes the narrowband component $n(t)$ of beam 34 along with approximately one-half of the mixed broadband components $b(t)$ and $b(t-T)$ of beams 34 and 36, respectively. Mixed beam 46, however, consists essentially of one-half the mixed broadband components $b(t)$ and $b(t-T)$ without the unwanted narrowband noise components. Mixed beam 46 is then directed to a beam splitter 48 where it is combined with undiffracted beam 38 for detection of a heterodyne beat frequency. Output beam 52 is detected by a photodetector 56 that generates a photocurrent $i(t)$ proportional to $b(t)$ plus an echo signal resulting from the time delay. Output beam 54 is detected by a photodetector 58 that generates a photo-current equal to $-i(t)$. The output of photodetector 56 is summed with the negative of the output of photodetector 58 at summing junction 60. Although not necessary to the invention, summing junction 60 may be used to improve the signal-to-noise ratio by detecting both beams 52 and 54. The output of summing junction 60 is processed by a filter 62 to cancel the echo portions of the signal caused by the time delay T. The final output at terminal 64 of adaptive notch filter 10 is proportional to the original broadband RF signal with the narrowband noise $n(t)$ effectively removed. Furthermore, filter 10 removes the narrowband components of the received RF signal without a priori knowledge of the narrowband frequencies. However, the effectiveness of filter 10 diminishes as the bandwidth of the unwanted narrowband signal increases to approach that of the useful broadband signal.

Although the present invention has been described with respect to a specific embodiment thereof, various changes and modifications may be suggested to one skilled in the art. Therefore, it is intended that the present invention encompass such changes and modifications as fall within the scope of the appended claims.

I claim:

1. A notch filter, comprising:
   means for modulating first and second mutually coherent light beams by a received RF signal comprising broadband and narrowband components, said second light beam being modulated by said RF signal at a predetermined time delay; and
   means for mixing said first and second modulated light beams to produce a first mixed beam comprising substantially all of said narrowband components and a second mixed beam consisting essentially of only said broadband components.

2. The notch filter of claim 1, wherein said modulating means comprises:
   a transducer for converting an electrical signal corresponding to said received RF signal into a corresponding acoustic wave;
   an acousto-optic cell connected to said transducer for propagating said acoustic wave; and
   said first and second light beams directed to pass through said acousto-optic cell at different positions along said acousto-optic cell.

3. The notch filter of claim 2, wherein said light beam mixing means comprises a photorefractive crystal.

4. The notch filter of claim 3, wherein said predetermined time delay is selected so that portions of said first and second light beams modulated by said narrowband components remain mutually coherent and portions of said first and second light beams modulated by said broadband components become mutually incoherent.

5. An adaptive notch filter, comprising:
   an acousto-optic cell for propagating an acoustic wave having broadband and narrowband components corresponding to a received RF signal;
   first and second mutually coherent light beams directed to pass through said acousto-optic cell at two different points to produce first and second diffracted light beams;
   said first diffracted light beam modulated by said acoustic wave and said second diffracted light beam modulated by said acoustic wave at a predetermined time delay; and
   a photorefractive crystal for mixing said first and second diffracted light beams to produce a first mixed beam comprising substantially all of said narrowband components and a second mixed beam consisting essentially of only said broadband components.

6. The adaptive notch filter of claim 5, wherein said predetermined time delay is selected so that portions of said first and second diffracted light beams modulated by said narrowband component remain mutually coherent and portions of said first and second diffracted light beams modulated by said broadband components become mutually incoherent.

7. The adaptive notch filter of claim 6, further comprising:
a beam splitter for receiving said second mixed beam and an undiffracted portion of said first light beam to produce an output beam having a heterodyne beat frequency; and
a photodetector for detecting said output beam and generating a photocurrent.

8. The adaptive notch filter of claim 7, further comprising an echo filter for removing time delay components from said photocurrent and providing an adaptive notch filter output proportional to said received RF signal with said narrowband components excised.

9. The adaptive notch filter of claim 8, further comprising a transducer connected to said acousto-optic cell for converting an electrical signal corresponding to said received RF signal into said acoustic wave.

10. A method of filtering narrowband components from a broadband RF signal, comprising the steps of:
modulating first and second mutually coherent light beams with the RF signal, said second light beam being modulated by the RF signal at a predetermined time delay with respect to modulation of said first light beam; and
mixing said first and second modulated light beams to produce a first mixed beam comprising substantially all of the narrowband components and a second mixed beam consisting essentially of the broadband RF signal without the narrowband components.

11. The method of claim 10, wherein the step of modulating further comprises the steps of:
converting the RF signal to a corresponding electrical signal;
converting said electrical signal to an acoustic wave having broadband and narrowband portions corresponding to the broadband and narrowband components of the RF signal;
propagating said acoustic wave in an acousto-optic cell; and
passing said first and second light beams through said acousto-optic cell at different positions along said acousto-optic cell.

12. The method of claim 10, wherein the step of mixing comprises directing said first and second modulated light beams through a photorefractive crystal.

13. The method of claim 10, further comprising the steps of:
converting said second mixed beam to a photocurrent; and
filtering said photocurrent to obtain an output proportional to the broadband RF signal with the narrowband components and time delay modulations excised.

* * * * *